United States Patent
Vembu et al.

(10) Patent No.: US 11,392,710 B2
(45) Date of Patent: Jul. 19, 2022

(54) METHODS AND APPARATUS FOR DOCUMENT CREATION VIA EMAIL

(71) Applicant: Zoho Corporation Private Limited, Kanchipuram District (IN)

(72) Inventors: Sridhar Vembu, Pleasanton, CA (US); Vijay Sundaram, Saratoga, CA (US); Karthikeyan Jambulingam, Chennai (IN); Sudheer A Grandhi, Pleasanton, CA (US)

(73) Assignee: Zoho Corporation Private Limited, Kanchipuram District (IN)

( * ) Notice: Subject to any disclaimer, the term of this patent is extended or adjusted under 35 U.S.C. 154(b) by 0 days.

(21) Appl. No.: 17/156,601

(22) Filed: Jan. 24, 2021

(65) Prior Publication Data

US 2021/0141916 A1    May 13, 2021

Related U.S. Application Data (63) Continuation of application No. 14/861,160, filed on Sep. 22, 2015, now abandoned.
(Continued)

(51) Int. Cl.
| | |
|---|---|
| *H04L 12/00* | (2006.01) |
| *G06F 21/62* | (2013.01) |
| *G06Q 10/10* | (2012.01) |
| *H04L 51/18* | (2022.01) |
| *G06F 40/117* | (2020.01) |
| *G06F 40/143* | (2020.01) |
| *G06F 40/14* | (2020.01) |

(52) U.S. Cl.
CPC ........ *G06F 21/6209* (2013.01); *G06F 40/117* (2020.01); *G06F 40/14* (2020.01); *G06F 40/143* (2020.01); *G06Q 10/101* (2013.01); *H04L 51/18* (2013.01)

(58) Field of Classification Search
CPC . G06Q 10/101; G06F 21/6209; G06F 40/143; G06F 40/14; G06F 40/117; H04L 51/18
USPC ...................................... 709/206, 204, 205
See application file for complete search history.

(56) References Cited

U.S. PATENT DOCUMENTS 5,671,428 A * 9/1997 Muranaga .............. G06Q 10/10
                                                  715/201
6,088,707 A    7/2000 Bates et al.
(Continued)

FOREIGN PATENT DOCUMENTS

WO    2012125815 A2    9/2012

OTHER PUBLICATIONS

Wroblewski, Touch Gesture Reference Guide, Apr. 19, 2010, web page printout.
(Continued)

*Primary Examiner* — Frantz Coby
(74) *Attorney, Agent, or Firm* — Arthur Behiel; Mark Lauer; Silicon Edge Law Group LLP (57) ABSTRACT

A system and method for creating a document in a messaging environment is described. A communication including a document specification including zero or more formatting commands and content is received from a sender and processed. The system and method determine whether the document specification is in a done condition, and iterates until done. A formatted document is also created and returned to the sender and recipients.

21 Claims, 7 Drawing Sheets

Related U.S. Application Data (60) Provisional application No. 62/181,960, filed on Jun. 19, 2015, provisional application No. 62/054,683, filed on Sep. 24, 2014.

(56) References Cited

U.S. PATENT DOCUMENTS

| | | | |
|---|---|---|---|
| 6,623,529 | B1 | 9/2003 | Lakritz |
| 7,299,411 | B2 * | 11/2007 | Blair .................... G06F 40/103 715/243 |
| 7,479,949 | B2 | 1/2009 | Jobs et al. |
| 7,680,895 | B2 | 3/2010 | Perlow et al. |
| 8,041,770 | B1 | 10/2011 | Schmidt |
| 8,514,221 | B2 | 8/2013 | King et al. |
| 8,645,872 | B2 | 2/2014 | Maxfield et al. |
| 8,766,928 | B2 | 7/2014 | Weeldreyer et al. |
| 2002/0010743 | A1 | 1/2002 | Ryan et al. |
| 2002/0078406 | A1 * | 6/2002 | Kondoh .................... G06F 8/33 714/48 |
| 2005/0015451 | A1 | 1/2005 | Sheldon et al. |
| 2006/0026535 | A1 | 2/2006 | Hotelling et al. |
| 2006/0137007 | A1 | 6/2006 | Paatero et al. |
| 2006/0259524 | A1 | 11/2006 | Horton |
| 2007/0010992 | A1 * | 1/2007 | Hon .................... G06F 40/253 704/9 |
| 2007/0118598 | A1 * | 5/2007 | Bedi .................... G06Q 10/107 709/204 |
| 2009/0307315 | A1 | 12/2009 | Jatavallabha et al. |
| 2010/0023536 | A1 * | 1/2010 | Lee .................... G06Q 30/02 706/47 |
| 2010/0131835 | A1 | 5/2010 | Kumar et al. |
| 2010/0161540 | A1 | 6/2010 | Anisimov et al. |
| 2011/0264705 | A1 | 10/2011 | Diamond |
| 2012/0089950 | A1 | 4/2012 | Tseng |
| 2012/0266159 | A1 | 10/2012 | Risbood et al. |
| 2013/0227420 | A1 | 8/2013 | Pasquero et al. |
| 2013/0244690 | A1 | 9/2013 | Huang et al. |
| 2014/0173423 | A1 | 6/2014 | Meisels et al. |
| 2014/0173530 | A1 | 6/2014 | Mesguich Havilio et al. |
| 2014/0196022 | A1 | 6/2014 | Skutin et al. |

OTHER PUBLICATIONS

ClickDesk, Live Chat, Video & VOIP, Helpdesk in one system, Aug. 6, 2014, web page printout.
Olark, Everything You Need to Make Customers Happy, Aug. 6, 2014, web page printout.
Olark, Targeted Chat, Aug. 6, 2014, web page printout.
Various contributors, Real user monitoring, (Wikipedia, Creative Commons), Sep. 9, 2014.
Google Support, Urchin Tracking Module (UTM), Sep. 17, 2015, web page printout.
AppsBuilder SpA, The All-in-One Tool, Nov. 15, 2015, web page printout.
SmartBear Software, Inc., AlertSite UXM What is Real-User Monitoring?, Sep. 9, 2014, web page printout.
Live Chat, For Customers—Chat Always available for your clients, Aug. 6, 2014, web page printout.
Zopim, Zopim Live Chat Features—Build Meaningful relationships, right on your website, Aug. 6, 2014, web site printout.
Guay, Matthew, Editorially—A Brilliant Markdown Collaborate Writing and Editing App, Jul. 19, 2013, web page printout.
Viticci, Federico, Our Favorite Markdown Writing App for the iPhone, The Sweet Setup (Blanc Media, LLC), Feb. 4, 2015, web page printout.

* cited by examiner

METHODS AND APPARATUS FOR DOCUMENT CREATION VIA EMAIL

FIELD OF THE INVENTION

The present disclosure relates generally to document creation, and more particularly to methods and systems for creating electronic documents using simple commands.

BACKGROUND

Electronic documents are typically created in special purpose applications that enable a user to view content and formatting while creating and modifying a document. Exemplary applications include those for creating presentations, e.g., Zoho Show available from Zoho Private Corporation Limited and Microsoft PowerPoint, text documents, e.g., Zoho Docs and Microsoft Word, spreadsheets, e.g., Zoho Sheet and Microsoft Excel, and drawings and charts, e.g., Microsoft Visio. Special purpose applications may be hosted, e.g., Zoho, Google, or installed locally on a computing device, e.g., Microsoft, and are typically used on devices having screens large enough to view the formatted content, e.g., conventional desktop and laptop computers, and large screen tablet devices.

These applications may also facilitate a collaborative workflow, e.g., document sharing and editing. Collaboration enables teams to share editing responsibilities and contribute creative content to, e.g., documents and presentations directed to marketing and selling products and services. To enable collaborative activity, the user typically administers and manages user credentials and access privileges for each document so that a collaborator may access and, if granted requisite access permissions, modify a document. Although special purpose applications are powerful, near-ubiquitous, and widely adopted, successfully creating documents and collaborating on small screen-devices in fast-moving, "on-the-go" environments remains challenging.

BRIEF DESCRIPTION OF THE DRAWINGS

The subject matter presented herein is illustrated by way of example and not by way of limitation in the figures of the accompanying drawings, in which like reference numerals refer to similar elements and in which.

DETAILED DESCRIPTION

Figure 1:
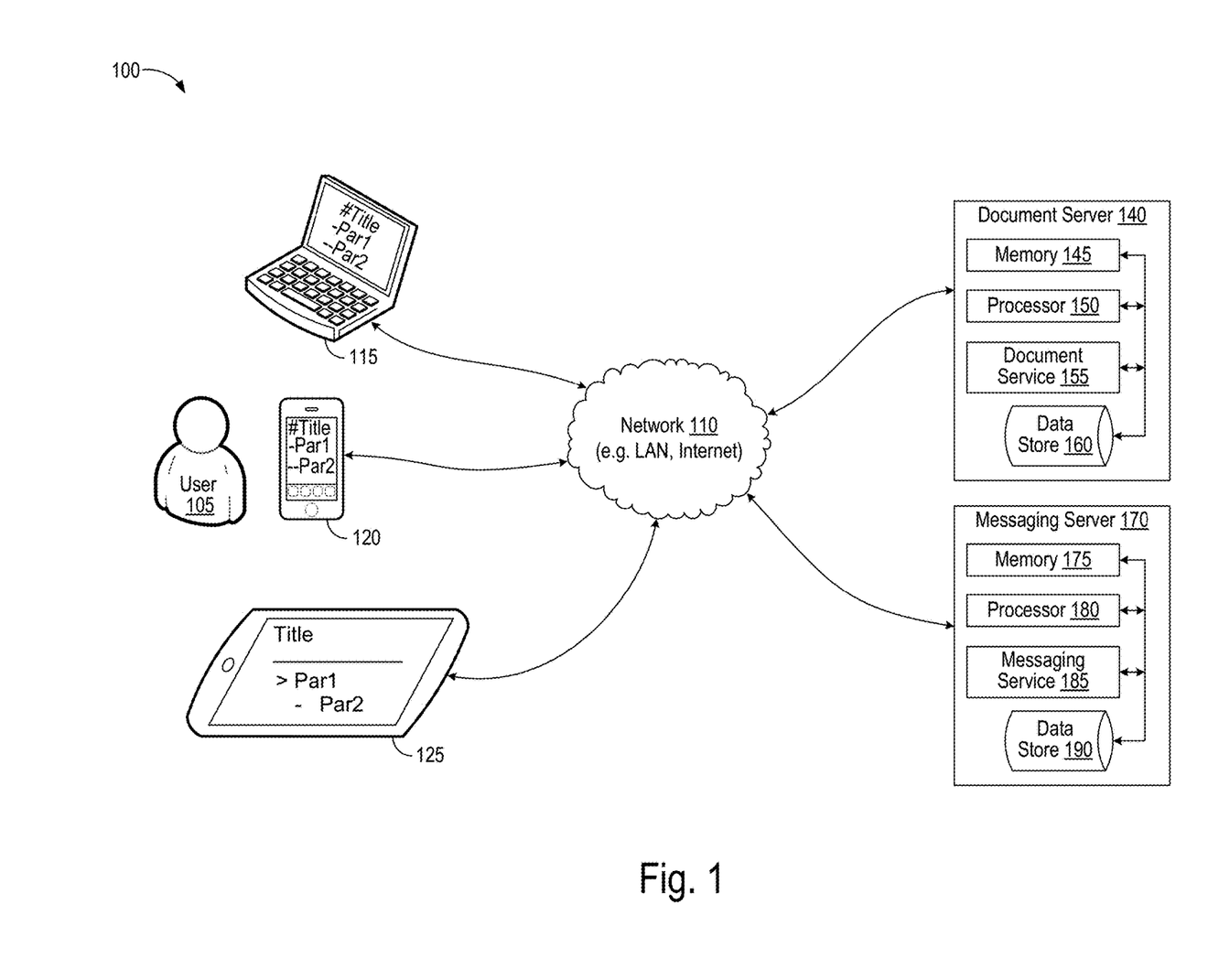
FIG. 1 depicts a system for producing a document in accordance with one embodiment.

FIG. 1 depicts a system 100 for producing a document in accordance with one embodiment. Exemplary documents include presentation slides, formatted text documents, spreadsheets, multimedia presentations, diagrams, and flow charts. Exemplary devices include laptop computer 115, wireless handheld mobile device 120, and wireless handheld tablet 125. Some devices, e.g., a mobile digital device such as an iPhone® available from Apple, Inc. of Cupertino, Calif., may be characterized as small-screen devices. These devices are employed by one or more users, e.g., user 105, to create a formatted document using simple commands. For example, user 105, desiring to create slides for a presentation, enters a document specification comprising formatting commands and content, e.g., as depicted on device 120 in FIG. 1. Device 120, in this example, a small-screen wireless handheld device, transmits a message, also referred to as a communication, including the document specification to a messaging server 170, and including a list of zero or more recipients with whom user 105, a sender, desires to collaborate.

Messaging server 170 includes messaging service 185 that receives the communication and forwards it to document service 155, included in document server 140. Messaging server 170 receives the communication in a number of formats capable of expressing a specification textually, e.g., plain text or HTML, including, e.g., email, SMS, and text message in accordance with one embodiment. Service 155 parses the message, applies the commands to the content, and produces and saves a formatted document, here, slides for a presentation document. Service 155 produces the document on a best-effort basis. Accordingly, a document may be created in the presence of one or more document specification errors, including fatal errors, and may be created as a partially formatted or blank document. Service 155 determines whether the document specification is in a "done" condition. If the specification is not in a "done" condition, document service 155 revises it, transmits it to the sender, e.g., user 105, and iterates until the specification is in a "done" condition. A specification is in a "done" condition when it includes no errors, or when it includes an express command, e.g., "!!!" indicating done. Document service 155 stamps the specification with a version indicator in one embodiment. "Stamping" the document specification includes including the version indicator in the specification, or in a separate message or associating the indicator with the specification separately, e.g., in a database or a computer file. In revising the document specification, document service 155 identifies errors, thereby advantageously enabling the sender to make corrections. Document service 155 introduces suggestions for improvements in formatting, e.g., font size, type, location, image sizing and location, into the specification it returns to the sender in accordance with another embodiment. Notably, a "done" condition expressed in a command, e.g., "!!!" unconditionally terminates iteration, even if the document specification includes errors.

Service 155 also establishes user accounts and document access privileges for user 105 and the recipients, and transmits the document to user 105 and the zero or more recipients. User 105 has thus created slides for a presentation using simple text commands in a messaging environment, established collaboration with the recipients, and did so on a small-screen wireless handheld mobile device.

Document and messaging servers 140 and 170 respectively comprise document and messaging services (155, 185), memory (145, 175), processor (150, 180), and storage (160, 190), in one embodiment. Messaging service 185 receives email, and associates messages it receives at certain addresses, e.g., create@zohoshow.com, user007@zohoshow.com, with document creation. It forwards these messages to document service 155, which creates and modifies a document based on the message, and manages user access to the document. In another embodiment, messaging service 185 receives messages via other protocols, e.g., short message service ("SMS"), and forwards them to document service 155. In another embodiment, document server 140 receives messages directly.

Figure 2:
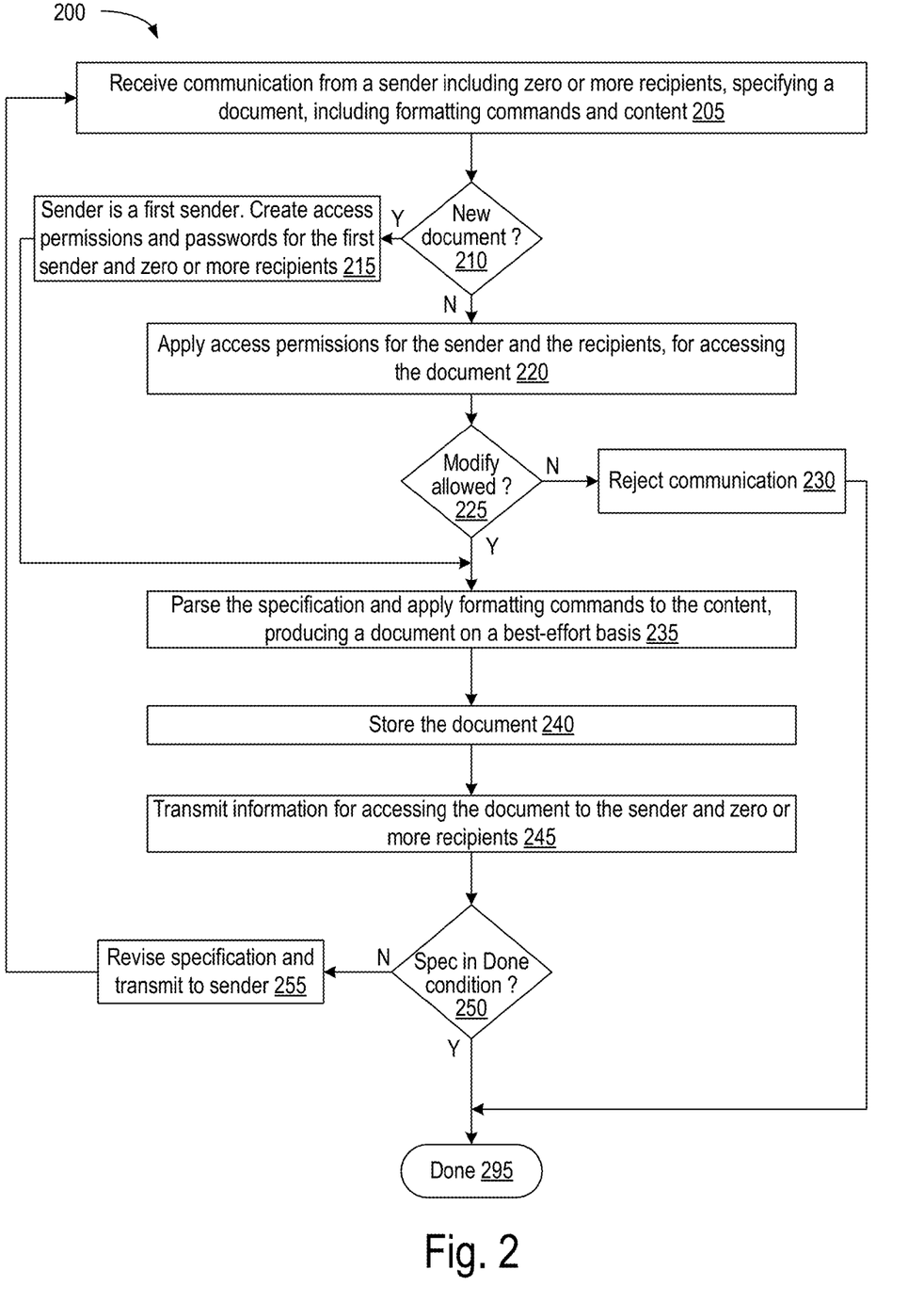
FIG. 2 is a flowchart depicting a computer-implemented method for producing a document in accordance with one embodiment.

FIG. 2 is a flowchart depicting a computer-implemented method for producing a document in accordance with one embodiment. At step 205, the method receives a communication, e.g., to document service 155 or messaging service 185, including a first communication from a sender, including a first sender, the message identifying zero or more recipients. In one embodiment, the method receives the first communication via text message, SMS, or email. The sender and zero or more recipients may be identified by, e.g., an email or SMS address. The communication includes a document specification including zero or more formatting commands and content. A formatting command determines how content will appear in a document, e.g., created or modified by, e.g., document service 155. In one embodiment, the formatting commands and content are comprised of plain text. In another embodiment, the formatting commands and content are comprised of hypertext markup language (HTML).

The method next determines, in step 210, whether the document is new. In one embodiment, the communication includes a link to an existing document, and no link if the document is new. In another embodiment, the communication includes a document identifier, e.g., a document name or I.D. If the method at step 210 determines the document is new, it names and creates a document, creates access permissions to the document for the sender and zero or more recipients, thereby enabling collaboration, and branches to step 235 for further processing, described below. In one embodiment, access permissions include creating a user account and password corresponding to a messaging, e.g., email, address for the sender if a user account does not yet exist. If the method, in step 210, determines the document is not new, it branches to step 220 and compares the document's access permissions to the sender and recipients identified in the communication. If the access permissions prohibit the sender from modifying the document, the method rejects the communication at step 230, branches to step 295, and is done. If modification is not prohibited, then processing continues at step 235.

The method at step 235 parses the communication, applies the formatting commands to the content, and produces a document, e.g., via document service 155. "Produces" includes creating and modifying a document. Notably, if the document specification includes fatal errors, as might occur in the case of an unconditional done command ("!!!"), document service 155 creates a document on a best-effort basis, even if the document it creates is blank. Details relating to applying formatting commands to content are described with respect to FIGS. 3-5 below. The method stores the document, e.g., in data store 160, at step 240, and at step 245, transmits information for accessing the document to the sender and to the zero or more recipients. The method transmits a copy of the document specification used in creating the document in one embodiment. The method stamps the specification with a version indicator in accordance with one embodiment. The version indicator relating to the document specification is tracked and maintained along with a mapping to the corresponding document version. "Transmits" includes transmitting information for accessing the document to the first sender and to zero or more recipients, transmitting the document itself, e.g., via attachment to, e.g., an email, SMS, or text message, or transmitting a message including a link to a document, e.g., a uniform resource locator (URL) or other link identifying a location, e.g., data store 160, corresponding to the document. Information for accessing the document includes the document or a link identifying its location, account information, e.g., user name, password, and information identifying the document, e.g., a document I.D. or name.

At step 250, the method determines whether the document specification is in a "done" condition. A document specification is "done" if expressly so indicated in an "unconditional done" command, e.g., "!!!" or if the specification contains no errors. A specification error is one that cannot be corrected by document service 155, e.g., as in the case of an erroneous command. An erroneous command includes, e.g., a misspelling, an erroneous parameter, or the non-existence of any formatting command. If the document specification is not in a "done" condition, the method transitions to step 255, revises the document specification and transmits it to the sender. In revising the document specification, the method identifies errors and suggests corrections, thereby advantageously enabling the sender to produce an error-free specification. For example, if the method detects an error comprising a non-existence of any formatting command, e.g., the document specification is blank, it creates and transmits to the sender a specification including, e.g., formatting rules or instructions for creating a document. This enables a user, e.g., the sender, to conveniently obtain formatting instructions, simply by transmitting a blank message to, e.g., document service 155. In another embodiment, the method returns a text-based template including formatting commands and content placeholders. In another embodiment, the method creates and transmits a specification, applying as many formatting commands as are correct, and including error messages pertaining to erroneous formatting commands. In another embodiment, the method attempts to correct and apply erroneous formatting commands. Notably, in the case of a blank specification, "applying zero or more formatting commands" implies creating a blank document and transmitting to the sender a specification, e.g., one containing instructions explaining how to create a document specification. The method also introduces suggestions for improvements in formatting, e.g., font size, type, location, image sizing and location, thereby advantageously assisting the user to produce an aesthetically pleasing document. In one embodiment, the method stamps the specification with a version indicator. The method iterates until the document specification includes no errors, or includes an unconditional "done" command, e.g.,"!!!". Upon detecting a "done" condition in the document specification, the method at step 250 transitions to step 295, and is done.

Figure 3:
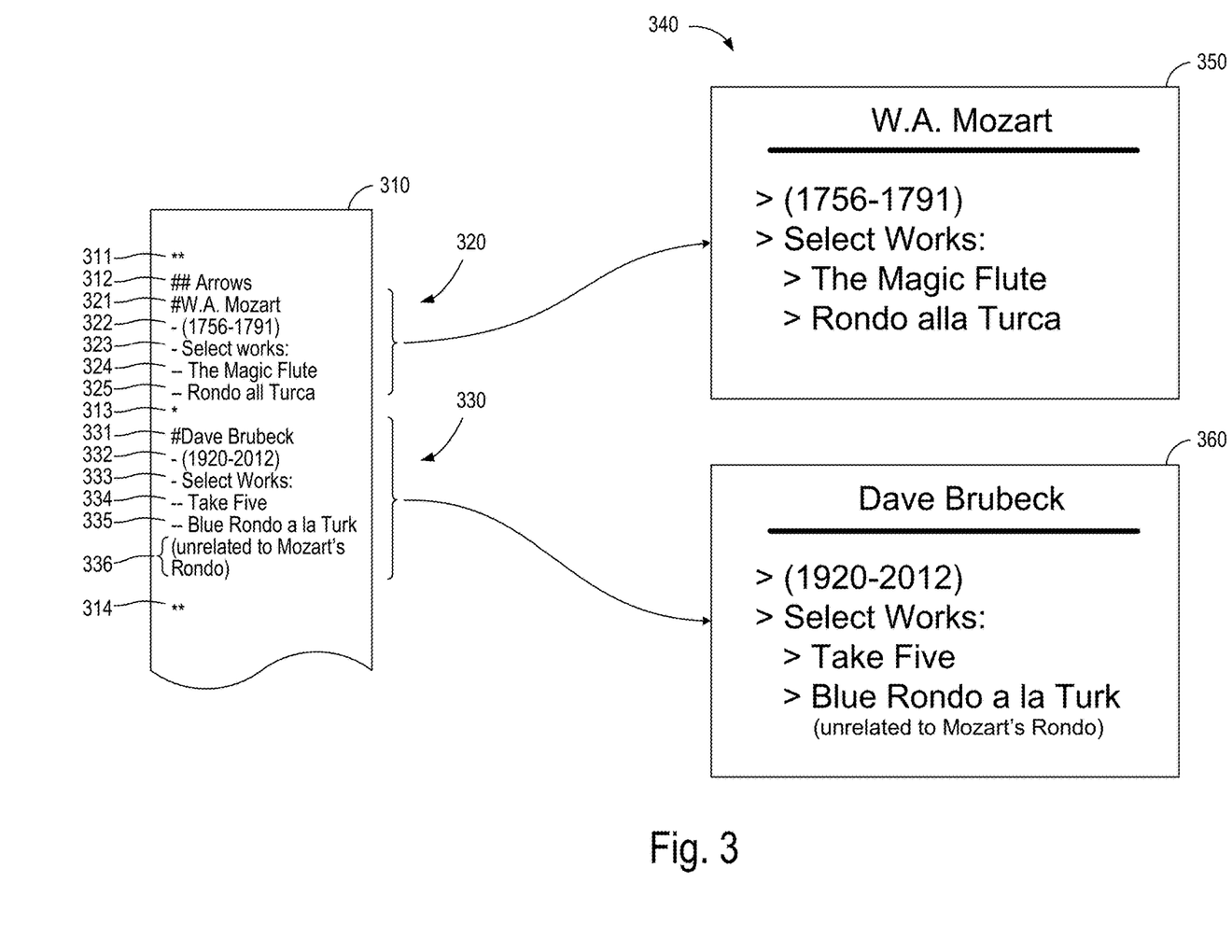
FIG. 3 depicts exemplary formatting commands for producing a document in accordance with one embodiment.

FIG. 3 depicts exemplary formatting commands and content, and a document including two presentation slides produced by applying the formatting commands to the content in accordance with one embodiment. In one embodiment, a message 310 is processed by document service 155. Message 310 includes formatting commands and content including directives 311-314 for structuring and stylizing a document 340 having two presentation slides, and first and second sets of document specifications 320 and 330, corresponding to first and second presentation slides 350 and 360. For simplicity, message 310 depicts only formatting commands and content, and omits sender and recipient identities, and other information, e.g., document identifying information. In one embodiment, formatting commands and content comprise a single item, e.g., content only, or formatting only.

In another embodiment, formatting commands and content comprise zero items, e.g., blank.

Figure 5:
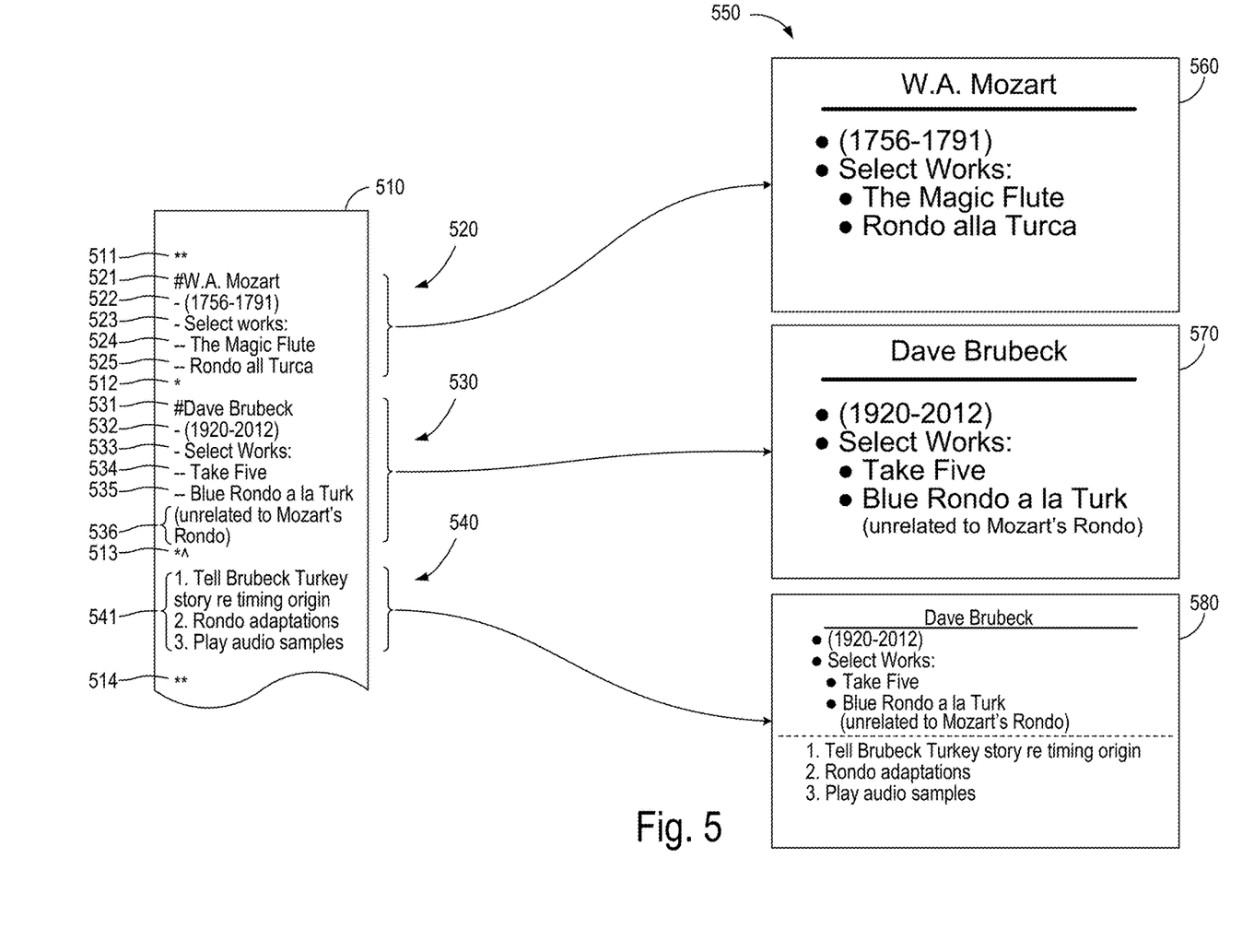
FIG. 5 depicts exemplary formatting commands for producing a document in accordance with still another embodiment.

Directives 311 and 314, "**" (double asterisk), signal respectively a beginning and ending point of formatting commands and content. A directive, "##" (double pound), followed by a parameter or keyword, specifies an overall style for the document. In one embodiment, the "##" directive also serves to select a document type. For example, "##ZDocsOutline" specifies a text formatted document, e.g., Zoho Docs or Microsoft Word formatting, using an outline style. Here, directive 312, "##Arrows," specifies the document type is presentation slides, and a style entitled "Arrows" will be applied to slides 350 and 360. For example, in first slide 350, style "Arrows" includes a centered title, "W. A. Mozart," a separator bar at a specified distance between the title, and bullet points introduced by an arrow ">" character. In one embodiment, default font, size, spacing, and a background image or color are specified in the style. In the absence of a style directive, e.g., "##" is omitted, a default style is applied in one embodiment. In FIG. 5, for example, no "##" has been specified in message 510. The resultant slides 560-580 are stylized in a default format in which a solid circle introduces bullet points rather than the arrow ">" depicted in slides 350 and 360. Directive 313 "*" (single asterisk) signals the beginning of the second document specification 330 corresponding to second slide 360.

The first document specification 320 includes formatting commands and content corresponding to slide 350. A directive "#" (single pound) followed by text (formatting command and content) specifies a slide title. Here, "#W. A. Mozart" 321 titles slide 350 as "W. A. Mozart." As explained above, style "Arrows" specified in directive 312 centers the title and adds a separator bar beneath the title. Directive "-" (single hyphen) followed by text specifies a first level bullet. Here, "-(1756-1791)" 322 places a first level bullet beneath the separator bar in slide 350. The bullet is introduced by ">" in accordance with the "Arrows" style specified in directive 312. A second, first level bullet "-Select Works:" is specified in directive 323, and is placed next in sequence in slide 350. Directive "--" (double hyphen) followed by text specifies a second level bullet, right-indented relative to a first level bullet. Here, a second level bullet specified by "--The Magic Flute" 324 is placed on slide 350, in sequence below and indented to the right of "Select Works" specified in directive 323. A second, second level bullet, "--Rondo alla Turca," appears next in sequence on slide 350. In another embodiment, third and subsequent bullet levels may be specified respectively by triple and subsequent hyphens, e.g.,"---" (triple hyphen), and "----" (quadruple hyphen). In another embodiment, a bullet level may be indented to the right relative to a preceding bullet level, and font specifications relating to a bullet level may differ per level.

Slide 360 is produced by directives 331-335 of second document specification 330, just as directives 321-325 of first document specification 320 produced slide 350. An additional directive at 336 adds a parenthetical "(unrelated to Mozart's Rondo)" in sequence beneath second level bullet ">Blue Rondo ala Turk" in slide 350. Notably, the directive at 336 is blank, i.e., only slide text is specified. In the embodiment depicted in FIG. 3, the blank directive adopts the formatting of the directive it follows (here, the second level bullet specified in directive 335), omits the introducing arrow ">", and decreases font size. In another embodiment, the blank directive left justifies its text relative to the slide and applies a font format specified in the style, e.g., "Arrows" or the default style.

Figure 4:
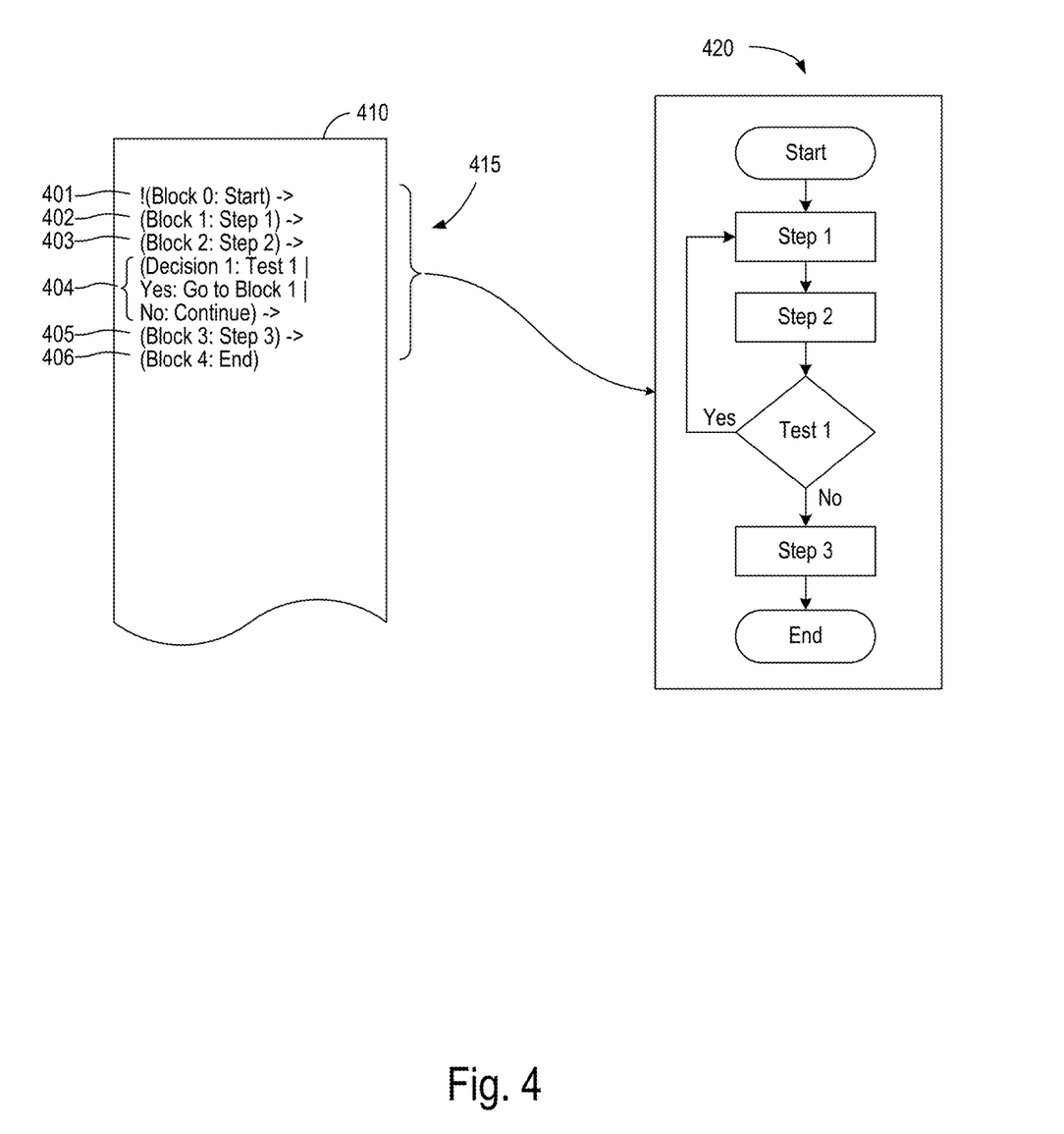
FIG. 4 depicts exemplary formatting commands for producing a document in accordance with another embodiment.

FIG. 4 depicts exemplary formatting commands for producing a document including a flow chart in accordance with another embodiment. In one embodiment, a message 410, including formatting and content for producing a flow chart 420, is processed by document service 155. Directive 401 begins with "!" (exclamation point, or "bang" character) introducing a flow chart. Formatting commands and content (directives and related text) following the bang "!" specifying elements, e.g., blocks and decision points of the flow chart, are enclosed in parentheses. Parenthesized directives and text are delimited by "→" (hyphen-arrow combination) in one embodiment. Parenthesized directives and text are connected with a direction indication, denoted by "→" (hyphen-arrow combination) in accordance with another embodiment. Intra-directives are delimited by "|" (vertical bar, or "pipe" character), e.g., as in the decision directive depicted in directive 404, in another embodiment. Directives need not, but may, be written as separate lines. For example, the "!" that begins directive 401 may appear on a line by itself. Moreover, directives 401-406 and related delimiters, although depicted as separate lines for clarity of description, may be concatenated.

The parenthetical section of directive 401, "(Block 0: Start)" specifies a beginning block "Start" of flow chart 420, stylized as a rounded-corner rectangle. Directives 402 "(Block 1: Step 1)" and 403 "(Block 2: Step 2)" follow, resulting in blocks "Step 1" and "Step 2" connected by an arrow extending respectively from Start to Step 1, and Step 1 to Step 2, in flow chart 420, each block stylized as a squared-corner rectangle. A decision block is specified in directive 404. Directive "(Decision 1: Test 1)" causes a decision symbol (a rhombus, vertically oriented along one diagonal) "Test 1" to appear in flow chart 420 below "Step 2" connected by an arrow extending from Step 2 to Test 1. Following delimiter "|", a branch specified by "Yes: Go to Block 1" causes an arrow to extend from decision block "Test 1" to "Step 1" as depicted in flowchart 420. Continuing, a branch specified by "No: Continue" causes an arrow to extend from decision block "Test 1" to a subsequent block, "Step 3," specified in directive 405. In one embodiment, decision 1 causes "YES" and "NO" labels to appear adjacent to the arrows corresponding to its "YES" and "NO" branches. In another embodiment, the labels appear respectively as "Y" and "N." Directive 406 "(Block 4: End)" specifies an ending block "End" of flow chart 420, stylized as a rounded-corner rectangle, and an arrow extending from block "Step 3" to "End." Document specification 415 may specify one or more portions of a document, and may be combined with any other formatting commands and content in a document.

FIG. 5 depicts exemplary formatting commands for producing a document 550 including succinct and details modes of a document in accordance with still another embodiment. In one embodiment, a message 510 is processed by document service 155. Message 510 includes formatting commands and content including directives 511-514 for structuring and stylizing a document 550 having three presentation slides, and first, second, and third sets of document specifications 520-540, corresponding to first, second, and third presentation slides 560-580. For simplicity, message 510 depicts only formatting commands and content, and omits sender and recipient identities, and other information, e.g., document identifying information. In one embodiment, formatting commands and content comprise a single item. In a further embodiment, formatting commands and content comprise zero items, e.g., blank.

Document specifications 520 and 530 cause slides 560 and 570 to be produced in the same way, described in FIG. 3 above, as specifications 320 and 330 cause slides 350 and 360 to be produced, with one difference. As explained with respect to FIG. 3, directive 312 ("##Arrows") applies style "Arrows" to document 340 such that bullet points on slides 350-360 are introduced by an arrow character ">", whereas the absence of a style ("##") directive in specification 520 applies a default style to slides 560-580. As depicted in FIG. 5, bullet points in slides 560-580 are introduced by a solid circle rather than the arrow ">" appearing in slides 350-360.

Some presenters find it useful to have notes along with or among presentation slides. Notes may contain background, factual, and other information allowing a presenter to, e.g., relate anecdotes, respond to audience questions, and in general, deliver a presentation more conversationally than might be possible without notes. In one embodiment, a detailed slide, e.g., slide 580, includes a notes portion and an audience portion, the audience portion including information from another presentation slide. A directive "*^" (asterisk-caret) signals a new slide having content copied from a preceding document specification, corresponding to a preceding slide. In one embodiment, the new slide is designated "detailed," and the slide from which the content is copied is designated "succinct." The detailed slide includes an audience portion (content corresponding to the succinct slide) and a notes portion.

Directive 513 "*^" (asterisk-caret) signals a new detailed slide 580 based on a succinct slide 570. In response to directive 513, document service 155 creates a new detailed slide 580 having an upper (audience) portion and a (lower) notes portion. Service 155 copies content from document specification 530 corresponding to succinct slide 570 into the upper portion. In one embodiment, formatting prescribed in specification 530 and a style, e.g., "Arrows" as specified in directive 312 of FIG. 3, or a default format as here, is applied to the audience portion, and font sizing and spacing between elements are reduced, as depicted in slide 580, to make room for the notes portion. Service 155 also places a separator, e.g., a dashed bar as depicted in slide 580, between the audience and notes portions. In another embodiment, the separator is a solid bar. In one embodiment, font sizing and element spacing are reduced corresponding to a number of notes, e.g., three (3) notes results in 20% reduction, and e.g., seven (7) notes results in a 50% reduction. Service 155 determines an amount of reduction based on initial font sizes and spacing in one embodiment.

Directive 541 is blank, i.e., only notes text is specified. Thus, notes 1, 2, and 3 at directive 541 appear in the notes portion of slide 580. In one embodiment, document service 155 automatically adds an additional slide (not shown) if it determines one would be appropriate. For example, if a number of notes becomes so large that reductions in font size and spacing would render a slide "unreadable," e.g., font size and spacing less than, e.g., 10 pt., then service 155 adds a page to hold additional notes. In one embodiment, the additional page includes audience and notes portions. In another embodiment, the additional page includes only a notes portion. Directive 514 "**" (double asterisks) signals the end of formatting commands and comment, corresponding to the end of document 550.

Figure 6:
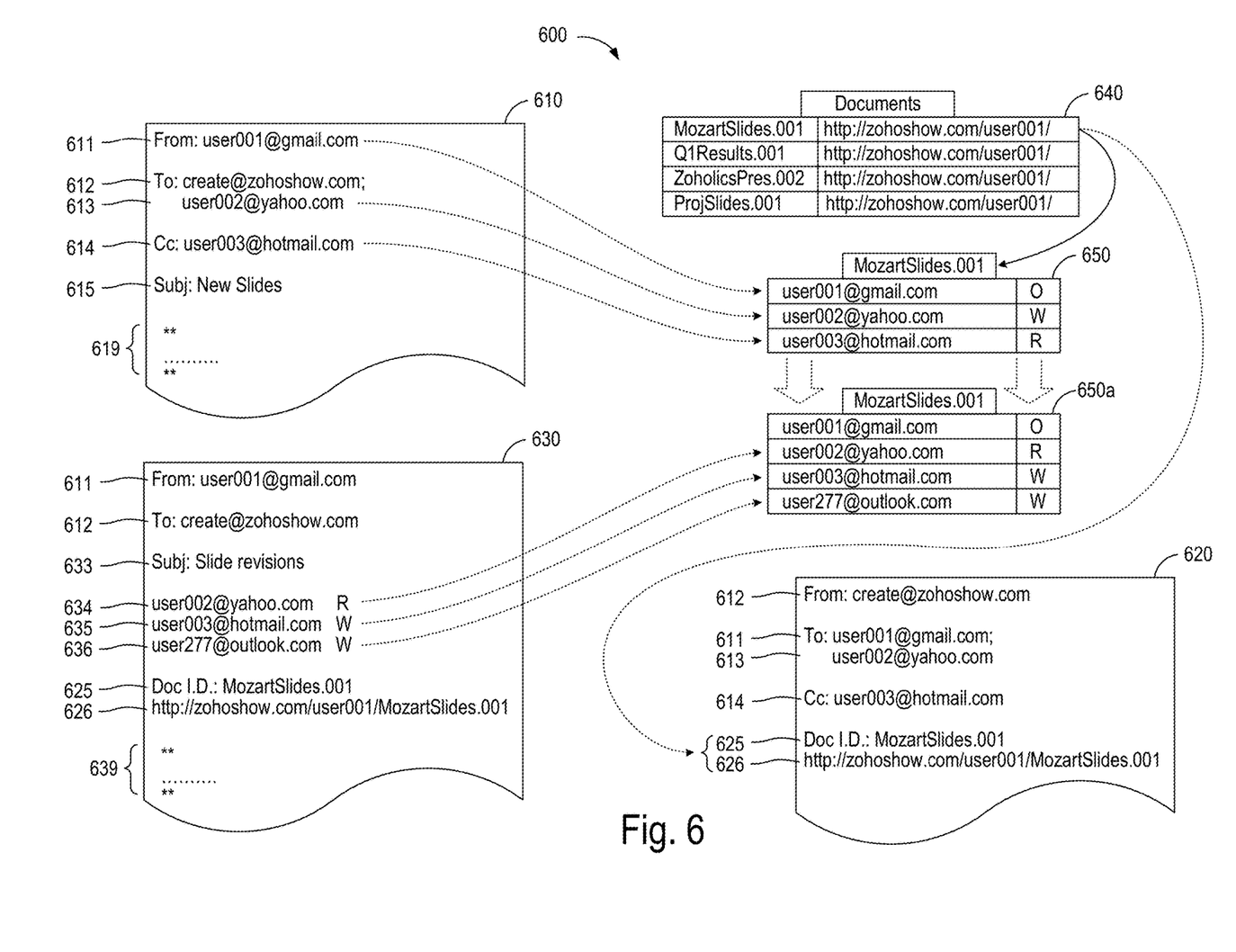
FIG. 6 depicts a data structure for assigning document access privileges in one embodiment.

FIG. 6 depicts a data structure for assigning document access privileges in one embodiment. The data structure is used by document service 155 to create and maintain user access permissions, thereby enabling user 105 to conveniently include collaborators in creating and modifying a document. Document service 155 receives a communication 610 specifying a sender and zero or more recipients respectively corresponding to zero or more collaborators identified in one or more address fields, e.g., "To:," "Cc:," and "Bcc:" of the communication, the one or more address fields corresponding to one or more document access privileges. In one embodiment, message 610 is an email directed to a dedicated recipient 612, create@zohoshow.com, identified in the "To:" header field of the message. Dedicated recipient 612 is used, e.g., to direct message 610 to document service 155. In one embodiment, dedicated recipient 612 distinguishes the document type to be created. For example, a message directed to create@zohoshow.com signifies presentation slides, and a message directed to createdocs@zohoshow.com signifies creation of a formatted text document compatible with, e.g., Microsoft Word or Zoho Docs. In another embodiment, the document type to be created is distinguished within the message body, e.g., as described with respect to directive 312 above.

Returning to message 610, a sender 611, user001@gmail.com, is identified in the "From:" header field of message 610. Additional recipients, identified in either the "To:", "Cc:" or "Bcc:" fields, signify collaborators. If the document is new, e.g., message 610 does not include a document I.D. or name, service 155 creates a document I.D., MozartSlides.001, assigns a location, http:// zohoshare.com/user001, and enters them in document table 640. Service 155 creates permissions table 650 corresponding to document I.D. MozartSlides.001, enters sender 611 (here, a first sender) user001@gmail.com and a flag "O" designating sender 611 as the owner of the document. An owner inherently has authority to modify permissions table 650, and read/write ("W") permissions to the document, here, MozartSlides.001.

In one embodiment, if the first sender does not have a user account, document server 155 creates one, e.g., user001@zohoshow.com, and a password. Service 155 may transmit a welcome message including account identity and password, to the first sender upon account creation in one embodiment. In another embodiment, a welcome message is included in a message relating to document creation. Advantageously, a sender may transmit a communication that includes a document specification to any of, e.g., create@zohoshow.com (to implicitly create a slideshow), createdocs@zohoshow.com (to implicitly create a formatted text document), or to the sender's account, e.g., user001@zohoshow.com, to create a document expressly identified in the document specification. Notably, irrespective of the account to which a document specification is directed, an express directive in a document specification to create or modify a particular document type overrides a type implied by a dedicated account such as createdocs@zoho.com. For example, user001@gmail.com transmits a communication that includes a document specification containing a directive to create a formatted text document to create@zohoshow.com. Even though create@zohoshow.com will create, by default, a slide show, the express directive to create a formatted text document in user001's communication overrides the default (implied slideshow creation), and document service 155 will create a formatted text document as expressly directed in user001's document specification. In another embodiment, document service 155 creates an account for a new user on messaging server 175, e.g., user888@zohomail.com, and recognizes that address for creating documents. Thus, the new user, e.g., user008@yahoo.com, may send a message to user888@zohomail.com to create and modify a document. Document service 155 therefore supports a plurality of user accounts, and processes messages for a plurality of document types in the user accounts.

Service 155 identifies recipient 613, user002@yahoo.com, in the "To:" field of the message header, stores it in permissions table 650, and assigns recipient 613 read/write ("W") permission. Because recipient 614, user003@hotmail.com, is in the "Cc:" field of the message header, service 155 assigns recipient 614 read-only ("R") permission in permissions table 650. In another embodiment, recipients appearing in the "To:" and "Cc:" fields are respectively assigned "R" and "W" permissions. Subject line 615 is for human readability and is ignored. Formatting commands and content 619 are processed as explained above. In another embodiment, message 610 includes express access permissions, e.g., 634-636 as depicted in message 630.

Service 155 transmits message 620 to first sender 611 and recipients 613-614 including a link to document location 626 (http://zohoshow.com/user001/MozartSlides.001), and document I.D. 625 (MozartSlides.001), which it retrieved from document table 640. First sender 611 and recipients 613-614 may open the document via the link. In another embodiment, message 620 includes document MozartSlides.001 as an attachment. In one embodiment, message 620 is directed to recipients 613 and 614 in the "To:" and "Cc:" fields of message 620, in accordance with their respective locations in the header of message 610.

Message 630, received from first sender 611, user001@gmail.com, includes formatting commands and content 639 for modifying document MozartSlides.001. Subject 633 is for human readability and is ignored. Message 630 also includes instructions to modify access permissions to MozartSlides.001. Permissions table 650 depicts user002@yahoo.com having "W" (read/write) permissions and user003@hotmail.com having "R" (read-only) permissions. Applying instructions 634-636, service 155 modifies access permissions in permissions table 650, depicted in its post-modification state as table 650a, as follows: user001@gmail.com is unmodified, user002@yahoo.com is modified from "W" to "R," user003@hotmail.com is modified from "R" to "W," and user227@outlook.com is added with access permission "W." In another embodiment, service 155 effectuates the same modifications to MozartSlides.001 access permissions by processing a message having user002@yahoo.com in the "Cc:" field, and user003@hotmail.com and user277@gmail.com in the "To:" field of the message header.

In one embodiment, a document specification contains a fillable field, e.g., "Subject Title: FILL_IN." A user replaces "FILL_IN" with descriptive text, e.g., "Invention of the Steam Engine," "Mozart," or "Rock Climbing." Document service 155 may fill or add content relating to the descriptive text, e.g., text, images, audio, video, and other multimedia information. Document service 155 may insert the content directly, or insert a link referencing the content, e.g., a URL. A user attaches content, or a link to it, e.g., a URL, in the document specification, and document service 155 parses and includes the content in the document it creates on behalf of the sender (creator) of the document.

Document service 155 enhances collaboration among users in another embodiment by identifying and highlighting edits and comments, and enabling the sender (a document creator or collaborator) to accept and reject edits. Document service 155 thereby tracks and associates one or more updates, e.g., edits and comments, to a document specification, with a sender. In another embodiment, a system and method for creating a document are provided via a cloud-based email service in which users create and share an email message comprising the document in a web browser or ordinary email interface. A user may share an email message including a document specification with collaborators, who have permissions to read and write to the specification in accordance with the permissions described with respect to FIG. 6. A specialized document specification editor is provided in another embodiment, in which document service 155 identifies and highlights edits and comments to the specification by one or more collaborators, and enabling the document creator (sender) to accept and reject edits. Read and write permissions as to collaborators are enforced in accordance with FIG. 6.

Document and messaging servers 140 and 170 depicted in FIG. 1 respectively comprise memory (145, 175), a processor (150, 180), and storage (160, 190). As one of skill in the art will appreciate, a device, e.g., a server, computer system, laptop computer, and wireless handheld device, may include one or more processors, memory and storage units, peripherals, and communication interfaces, any of which may communicate via, e.g., a system bus, network, or any other communication medium. A processor may be realized by a microprocessor, memory may include random access (RAM) and ready only (ROM) memory for storing and retrieving, e.g., information, instructions, and program modules for execution by the processor. A storage unit, e.g., 160 and 190 depicted in FIG. 1, may be fixed or removable, and may be realized by, e.g., hard disk, optical disk, solid state disk, and flash memory. The storage unit may store program modules, e.g., an operating system, application programs, system drivers and applications, e.g., a communication module, and data. Peripherals, e.g., input/output devices may include, e.g., keyboard, mouse, microphone, speaker, touch screen display, and motion sensors. A communication interface enables communication among devices over various wired and wireless networks, and may include, e.g., a modem, Ethernet or Network Interface Controller (NIC) card. Any device may be configured to function as a client or server device. Variations of the foregoing will be obvious to those of ordinary skill in the art.

Figure 7:
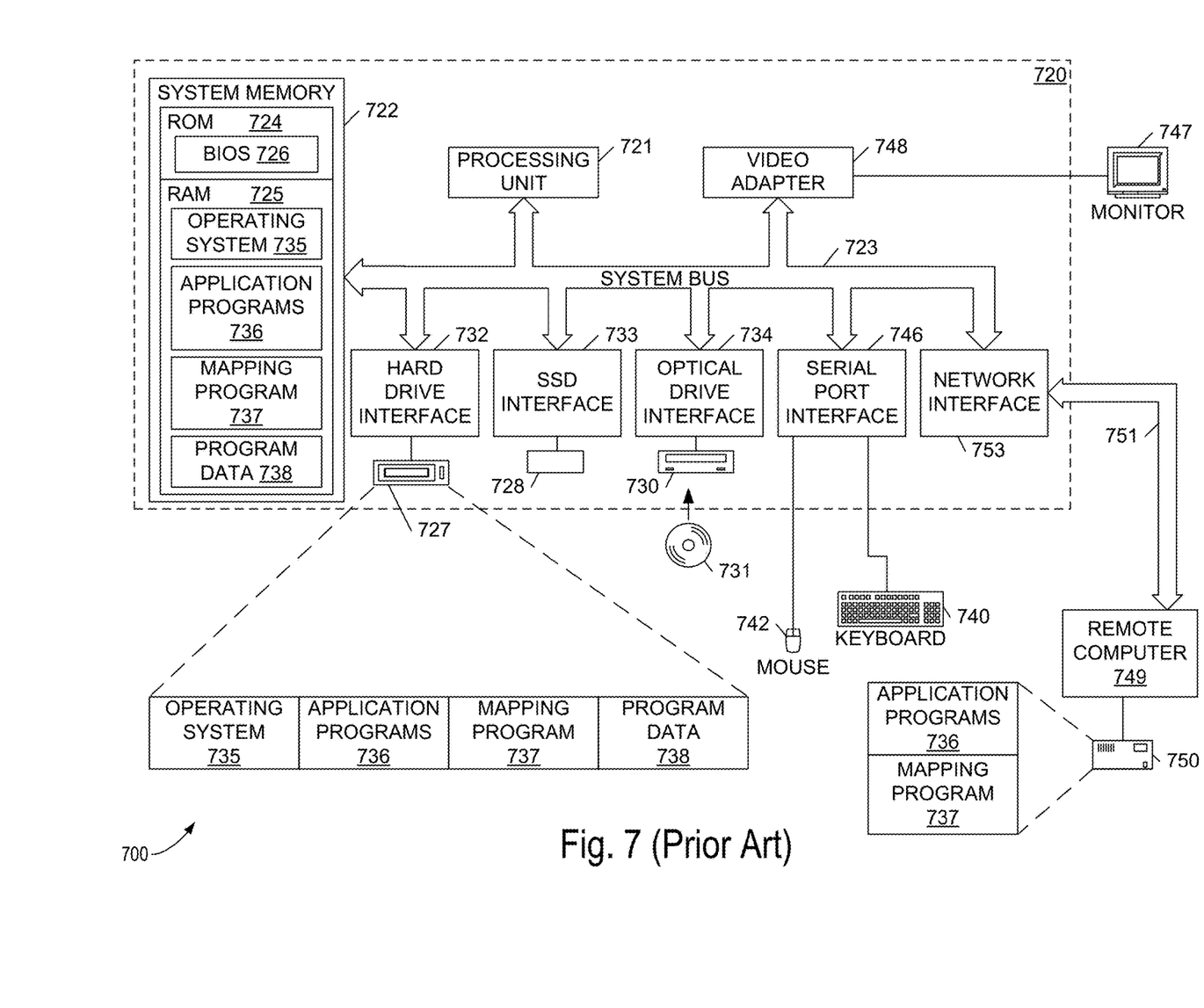
FIG. 7 depicts a suitable prior art computing environment in which the invention may be implemented.

FIG. 7 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform particular tasks or implement particular abstract data types. In a distributed computing environment, program modules may be located in both local and remote memory storage devices, and may be executed by client and server computers.

FIG. 7 depicts a general-purpose computing system 700 that can serve as a client or a server depending on the program modules and components included. One or more computers of the type depicted in computing system 700 can be configured to perform operations described with respect to FIGS. 1-6. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 700 includes a conventional computer 720, including a processing unit 721, a system memory 722, and a system bus 723 that couples various system components including the system memory to the processing unit 721. The system bus 723 may be any of several types of bus structures, including a memory bus or memory controller, a peripheral bus, and a local bus using any of a variety of bus architectures. The system memory includes read only memory (ROM) 724 and random access memory (RAM) 725. A basic input/output system 726 (BIOS), containing the basic routines that help to transfer information between elements within the computer 720, such as during start-up, is stored in ROM 724. The computer 720 further includes a hard disk drive 727 for reading from and writing to a hard disk, not shown, a solid-state drive 728 (e.g. NAND flash memory), and an optical disk drive 730 for reading from or writing to an optical disk 731 (e.g., a CD or DVD). The hard disk drive 727 and optical disk drive 730 are connected to the system bus 723 by a hard disk drive interface 732 and an optical drive interface 734, respectively. The drives and their associated computer-readable media provide nonvolatile storage of computer readable instructions, data structures, program modules and other data for computer 720. Other types of computer-readable media can be used.

A number of program modules may be stored on the hard disk, solid state disk 728, optical disk 731, ROM 724 or RAM 725, including an operating system 735, one or more application programs 736, other program modules 737, and program data 738. A user may enter commands and information into the computer 720 through input devices such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a video adapter 748. In addition to the monitor, computers can include or be connected to other peripheral devices (not shown), such as speakers and printers.

The computer 720 may operate in a networked environment using logical connections to one or more remote computers, such as a remote computer 749. The remote computer 749 may be another computer, a server, a router, a network PC, a peer device or other common network node, and typically includes many or all of the elements described above relative to the computer 720, although only a memory storage device 750 has been illustrated in FIG. 7. The logical connections depicted in FIG. 7 include a network connection 751, which can support a local area network (LAN) and/or a wide area network (WAN). Such networking environments are commonplace in offices, enterprise-wide computer networks, intranets and the Internet.

Computer 720 includes a network interface 753 to communicate with remote computer 749 via network connection 751. In a networked environment, program modules depicted relative to the computer 720, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. For example, the wireless handheld devices discussed above are "smart phones" that support many services in addition to conventional voice functions. Portable computing devices such as tablet computers, e.g., an iPad manufactured by Apple, Inc. of Cupertino, Calif., and palm-top and lap-top computers, can be equipped as detailed herein to serve as wireless handheld devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art.

Document Server 140 and Messaging Server 170 may be realized as one or more servers, each including one or more services shown within Document Server 140 and Messaging Server 170, e.g., services 155 and 185. Document Server 140 and Messaging Server 170 may also be implemented as discrete servers in which each includes a processor, memory, storage, and modules, self-contained within a server having discrete physical boundaries. In this embodiment, communications among the processor, memory, storage, and modules, occur internally. A discrete server may also be embodied virtually, e.g., via VMWARE, or VIRTUALBOX. Document Server 140 and Messaging Server 170 may also be implemented in a distributed fashion, e.g., via a "hypervisor" implementation such as VMWARE, or as individual "cloud" services, in which processor, memory, and storage are not necessarily physically co-extensive. For example, processors 150 and 180 may be distributed across several physical processors communicating over a local area network. In such implementations, memories 145 and 175 may be physically separate from processors 150 and 180, and data stores 160 and 190, requiring communication over a potentially insecure communication link. Some embodiments therefore support secure communication links and data encryption for the communications into and out of Document Server 140 and Messaging Server 170. The components of servers 140 and 170 may be distributed across local and wide-area networks, including the Internet, as will be readily understood by those of skill in the art.

Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A computer-implemented method for creating a document, the method comprising:

receiving at least one electronic communication from a sender, the at least one electronic communication including a document specification having at least one formatting command and document content;

parsing the at least one electronic communication by a computer, the parsing including determining whether the document specification is in a done condition at least in part by determining by the computer whether the document specification includes a textual command indicating that the document specification is in the done condition;

creating the document responsive to the at least one electronic communication, the creating including applying the at least one formatting command to the document content;

storing the document; and transmitting information for accessing the document to the sender.

2. The computer-implemented method of claim 1, wherein the receiving the at least one electronic communication is via email.

3. The computer-implemented method of claim 1, further comprising identifying at least one recipient in the at least one electronic communication, and transmitting the information for accessing the document to the at least one recipient.

4. The computer-implemented method of claim 3, the at least one electronic communication further comprising one or more address fields identifying the at least one recipient and corresponding to one or more document access privileges for the at least one recipient.

5. The computer-implemented method of claim 1, further comprising detecting by the computer an error in the at least one formatting command.

6. The computer-implemented method of claim 5, further comprising determining that the document specification is not in the done condition, revising the document specification by the computer, thereby creating a revised document specification, and transmitting to the sender the revised document specification.

7. The computer-implemented method of claim 6, wherein revising the document specification includes identifying the error in the at least one formatting command and suggesting a correction.

8. The computer-implemented method of claim 6, wherein the revised document specification includes a template.

9. The computer-implemented method of claim 6, further comprising stamping the document specification with a version indicator and mapping the version indicator to a version of the document.

10. The computer-implemented method of claim 1, wherein the at least one formatting command comprises plain text.

11. A computer-implemented method for creating a document, the method comprising:

receiving at least one electronic communication from a sender, the at least one electronic communication including a document specification having at least one formatting command and document content;

parsing the at least one electronic communication by a computer, the parsing including determining whether the document specification is in a done condition at least in part by determining by the computer whether the document specification includes an error in the at least one formatting command, and if so suggesting a correction for the error;

creating the document responsive to the at least one electronic communication, the creating including applying the at least one formatting command to the document content;

storing the document; and transmitting information for accessing the document to the sender.

12. The computer-implemented method of claim 11, wherein the receiving the at least one electronic communication is via email.

13. The computer-implemented method of claim 11, further comprising identifying at least one recipient in the at least one electronic communication, and transmitting the information for accessing the document to the at least one recipient.

14. The computer-implemented method of claim 13, the at least one electronic communication further comprising one or more address fields identifying the at least one recipient and corresponding to one or more document access privileges for the at least one recipient.

15. The computer-implemented method of claim 11, further comprising revising the document specification by the computer to include the correction for the error, thereby creating a revised document specification, and transmitting the revised document specification to the sender.

16. The computer-implemented method of claim 15, further comprising stamping the document specification with a version indicator and mapping the version indicator to a version of the document.

17. A system comprising:

one or more computers configured to perform operations including:

receiving at least one electronic communication from a sender, the at least one electronic communication including a document specification having at least one formatting command and document content;

parsing the at least one electronic communication by a computer, the parsing including determining whether the document specification is in a done condition at least in part by determining by the computer whether the document specification includes a textual command indicating that the document specification is in the done condition;

creating the document responsive to the at least one electronic communication, the creating including applying the at least one formatting command to the document content;

storing the document; and transmitting information for accessing the document to the sender.

18. The system of claim 17, wherein the receiving the at least one electronic communication is via email.

19. The computer-implemented method of system 17, further comprising determining that the document specification is not in the done condition, revising the document specification by the computer, thereby creating a revised document specification, and transmitting to the sender the revised document specification.

20. The computer-implemented method of system 19, wherein revising the document specification includes detecting an error in the at least one formatting command and suggesting a correction.

21. The computer-implemented method of system 19, wherein the revised document specification includes a template.

* * * * *